United States Patent [19]

Green et al.

[11] Patent Number: 5,149,464
[45] Date of Patent: Sep. 22, 1992

[54] CATALYTIC GAS CONVERSION METHOD

[75] Inventors: Malcolm L. H. Green; Anthony K. Cheetham, both of Oxford; Patrick D. F. Vernon, Littlemore, all of Great Britain

[73] Assignee: Gas Research Institute, Chicago, Ill.

[21] Appl. No.: 546,291

[22] Filed: Jun. 29, 1990

[30] Foreign Application Priority Data

Jun. 30, 1989 [GB] United Kingdom ............... 8915111
Aug. 25, 1989 [GB] United Kingdom ............... 8919303
Jan. 24, 1990 [GB] United Kingdom ............... 9001665
Mar. 7, 1990 [GB] United Kingdom ............... 9005126

[51] Int. Cl.$^5$ .............................................. C07C 1/02
[52] U.S. Cl. .................................................. 252/373
[58] Field of Search ........................................ 252/373

[56] References Cited

U.S. PATENT DOCUMENTS

Re. 28,655  12/1975  Rostrup-Nielsen .
1,736,065   11/1929  Williams .
3,138,438    6/1964  Peras .
4,321,250    3/1982  Hart .
4,483,691   11/1984  McShea, III et al. .
4,618,451   10/1986  Gent .

FOREIGN PATENT DOCUMENTS 0164864  12/1985  European Pat. Off. .
0303438   2/1989  European Pat. Off. .
 335668   3/1989  European Pat. Off. .
0736600   9/1955  United Kingdom .
1399137   6/1975  United Kingdom .

OTHER PUBLICATIONS

Document entitled "TRW's Syngas Process"—(12 pages).
Keller, G. E. & Bhasin, M. M., *J. Catal.* 73, 9–19 (1982).
Hutchings, G. J., Scurell M. S. & Woodhouse, J. R., *Chem. Soc. Rev.* 18, 251–283 (1989).
Ashcroft, A. T., Cheetham, A. K., Green, M. L. H., Grey, C. P. & Vernon, P. D. F., *J. Chem. Soc. Chem. Commun.* 21, 1667–1669 (1989).
Gesser, H. D., Hunter, N. R. & Prakash, C. B., *Chem. Rev.* 85, 235–244 (1985).
Spencer, N. D. & Pereira, C. J., *J. Catal.* 116, 399–406 (1989).
Shell, Texaco: "Encyclopedia of Chemical Technology", Ed. Kirk. R. E. and Othmer, D. F. 3rd Edition, Wiley Interscience, N.Y., vol. 12, 952 (1980).
Henrici-Olive, G. & Olive, S., *Angew. Chem. Int. Ed. Eng.* 15, 136–141 (1976).
"Catalysis in $C_1$ Chemistry", Ed. Keim., W., D. Reidel Publ. Co., Dordrecht, (1983).
Rostrup-Nielsen, J. R. in "Catalysis, Science & Technology, vol. 5" (ed. Anderson, J. R. & Boudart, M., Springer, Berlin (1984).
Topp-Jorgensen, J., in "Methane Conversion" (ed. Bibby, D. M., Chang. C. D., Howe, R. F., and Yurchak, S.) Elsevier, p. 293 (1988).
Joklik, A. et al., Chemical Abstracts, vol. 50, No. 18, Col. 13414b, 1956, "The catalytic conversion of gaseous hydrocarbons with air, oxygen, . . . ".

*Primary Examiner*—Howard T. Mars
*Assistant Examiner*—Kimberly J. Kestler
*Attorney, Agent, or Firm*—Speckman & Pauley

[57] ABSTRACT

A method for selectively oxygenating methane to carbon monoxide and hydrogen by bringing the reactant gas mixture at a temperature of at least 600° C. into contact with a sold catalyst which is either:

a) a catalyst of the formula $M_xM'_yO_z$ where:
  M is at least one element selected from Mg, B, Al, Ln, Ga, Si, Ti, Zr and Hf,
  Ln is at least one member of lanthanum and the lanthanide series of elements,
  M' is a d-block transition metal,
  and each of the ratios $x/z$ and $y/z$ and $(x+y)/z$ is independently from 0.1 to 8; or
b) an oxide of a d-block transition metal; or
c) a d-block transition metal on a refractory support; or
d) a catalyst formed by heating a) or b) under the conditions of the reaction or under non-oxidizing conditions.

8 Claims, 6 Drawing Sheets

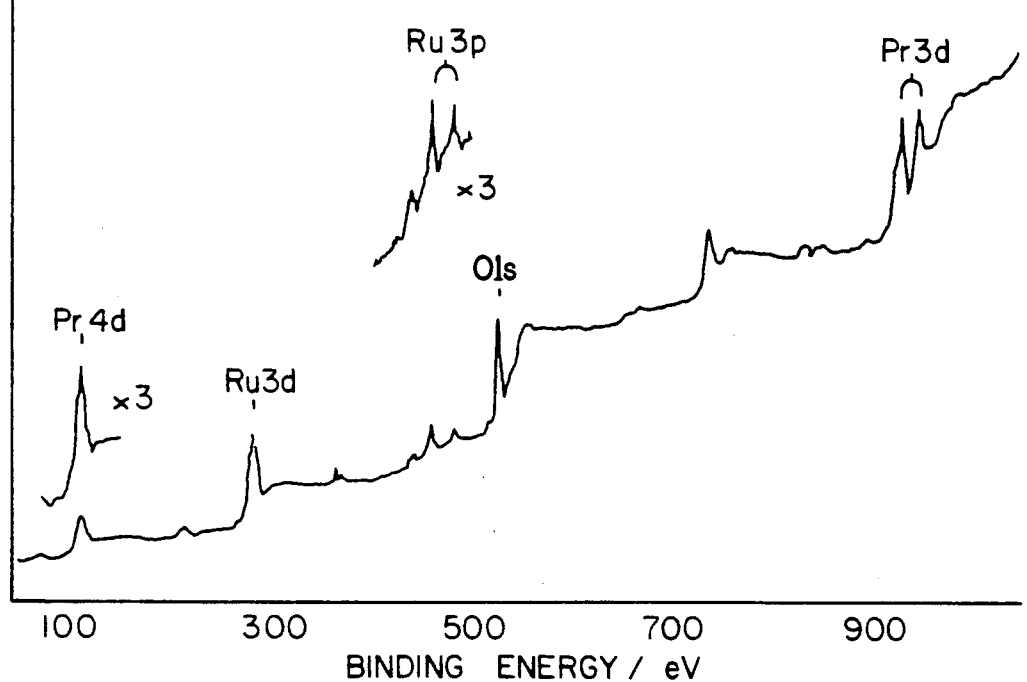
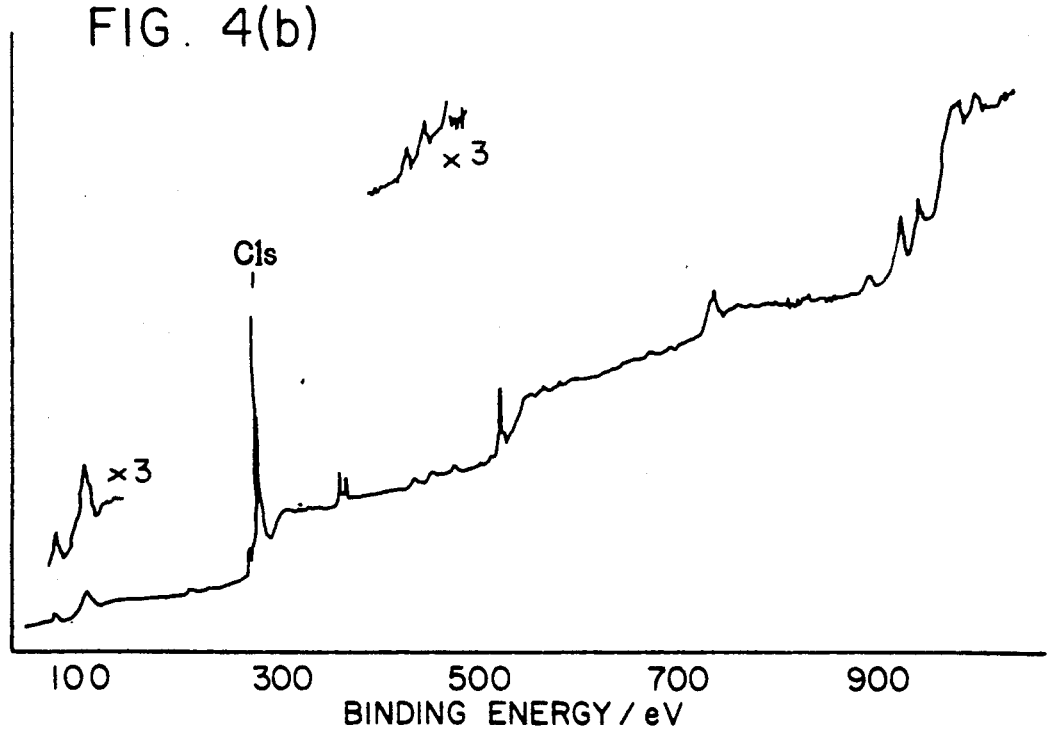

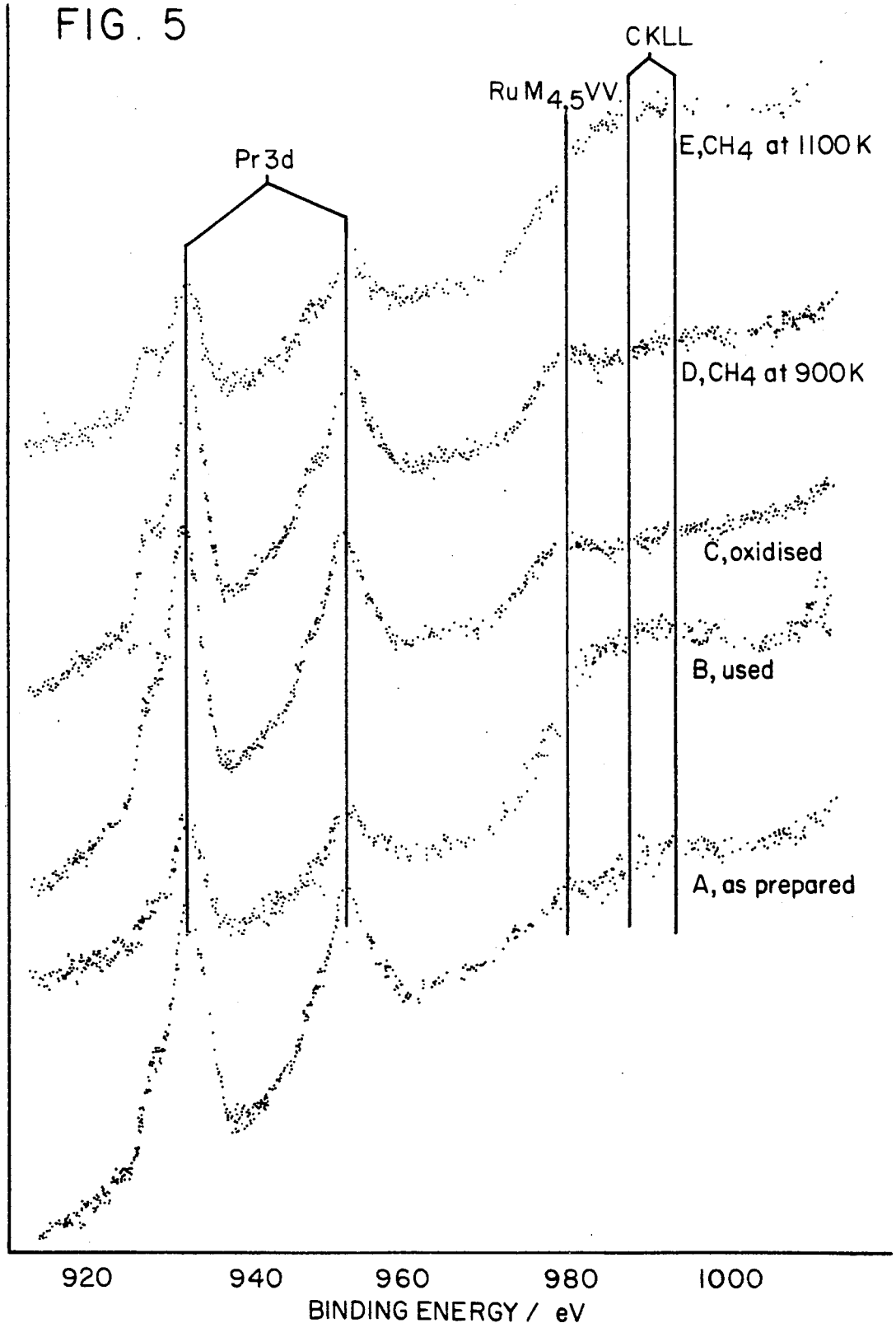

CATALYTIC GAS CONVERSION METHOD

BACKGROUND OF THE INVENTION

1. Field of the Invention

The diminishing reserves of petroleum oil have focused attention on the need to find alternative sources of carbonaceous materials and stimulated considerable interest in the possibility of making more effective use of the world's vast reserves of natural gas. At the present time, only a minor fraction of the available methane is being utilized. In the U.K., for example, it is used both as a fuel and as a feedstock, via steam reforming to synthesis gas (carbon monoxide and hydrogen), for methanol and ammonia synthesis, but in many parts of the world the collection and distribution of methane are uneconomical and it is burnt in situ to form carbon dioxide and water.

There are several known reactions for the oxygenation of methane.

$$CH_4 + O_2 \rightarrow CH_3OH$$

$$CH_4 + 1/2 O_2 \rightarrow CO + H_2$$

$$CH_4 + O_2 \rightarrow CH_2O + H_2O$$

$$CH_4 + O_2 \rightarrow C_2H_4 + C_2H_6 + CO_2 + CO + H_2O$$

$$CH_4 + O_2 \rightarrow CO_2 + H_2O$$

Different catalysts promote these reactions to different extents, but selectivity is normally poor. This patent application results from our discovery of a class of catalysts that is capable of selectively oxygenating methane to carbon monoxide and hydrogen.

2. Description of the Prior Art

Recently, attempts to convert methane directly into more valuable chemicals have focused on oxidative coupling reactions to yield ethylene and ethane: Keller, G. E. & Bhasin, M. M., J. Catal. 73, 9-19 (1982); Hutchings, G. J., Scurell M. S. & Woodhouse, J. R., Chem. Soc. Rev. 18, 251-283 (1989); and Ashcroft, A. T., Cheetham, A. K., Green, M. L. H., Grey, C. P. & Vernon, P. D. F., J. Chem. Soc. Chem. Commun. 21, 1667-1669 (1989), and direct oxygenation to methanol and formaldehyde: Gesser, H. D., Hunter, N. R. & Prakash, C. B., Chem. Rev. 85, 235-244 (1985); and Spencer, N. D. & Pereira, C. J., J. Catal. 116, 399-406 (1989). Unfortunately, under conditions where the reactions of methane are fast enough to be of interest (typically >700° C.), the formation of $CO_2$ is so favorable ($\Delta G \leftarrow 800$ kJ/mol) that partial oxidation to more useful products is difficult to achieve on an economical scale. The non-catalytic, gas-phase partial oxidation of methane to synthesis is an established industrial process (e.g., Shell, Texaco: "Encyclopedia of Chemical Technology", Ed. Kirk. R. E. and Othmer, D. F. 3rd Edition, Wiley Interscience, N.Y., Vol. 12, 952 (1980)), but operates at very high temperatures (>1200° C.). Synthesis gas mixtures are also formed in two step catalyzed reactions using mixtures of methane, water and oxygen which operate at elevated pressures and temperatures in excess of 1000° C., Encyclopedia of Chemical Technology, Ibid. This patent application results from our discovery of catalysts that are capable of selectively oxygenating methane to carbon monoxide and hydrogen so that the reaction can be carried out catalytically and at a substantially lower temperature (~775° C.). The significance of this result lies in the fact that synthesis gas is a well established feedstock for the synthesis of higher hydrocarbons, alcohols and aldehydes, for example in Fischer-Tropsch catalysis, for example, Henrici-Olive, G. & Olive, S., Angew. Chem. Int. Ed. Eng. 15, 136–141 (1976), thus facilitating efficient two-step processes for the conversion of methane to such materials. Equally, one possible application for synthesis gas produced at low pressures, is for use in fuel cell technology.

The overall reaction which is catalyzed is:

$$CH_4 + 1/2 O_2 \rightarrow CO + 2H_2$$

and this reaction is often described as the partial oxidation of methane.

As noted above, synthesis gas can be made by a number of methods, most of which involve the steam reforming of hydrocarbons or coal, "Catalysis in $C_1$ Chemistry", Ed. Keim., W., D. Reidel Publ. Co., Dordrecht, (1983). Methane, for example, can be converted over a nickel/alumina catalyst, Rostrup-Nielsen, J. R. in "Catalysis, Science & Technology, Vol. 5" (ed. Anderson, J. R. & Boudart, M., Springer, Berlin (1984) and Topp-Jorgensen, J., in "Methane Conversion" (ed. Bibby, D. M., Chang. C. D., Howe, R. F., and Yurchak, S.) Elsevier, p.293(1988), at 700°-800° C., according to:

$$CH_4 + H_2O \rightarrow CO = H_2$$

This reaction is an important source of carbon monoxide and hydrogen, but it is highly endothermic, and leads in addition to the formation of carbon dioxide via the water-gas shift equilibrium: $CO + H_2O \rightarrow CO_2 + H_2$. The partial oxidation reaction, by contrast, is mildly exothermic, more selective, and yields an $H_2/CO$ ratio that is lower than that obtained by steam reforming. This lower ratio may be highly desirable for certain applications of synthesis gas. Indeed, secondary reformers using $CO_2$ or $O_2$ oxidants are frequently required to reduce the hydrogen content of synthesis gas made by steam reforming.

In FR 1595993, Chimigaz, there is described a method for the catalytic partial oxidation of methane to carbon monoxide plus hydrogen But the temperatures of 1000°-1200° C. were so high as to be uneconomic.

In EPA 303 438, Davy McKee Corporation, there is described a catalytic partial oxidation process for converting a hydrocarbon feedstock to synthesis gas. The process described uses steam in addition to oxygen and runs at temperatures of 870° C. to 1040° C. and a pressure of about 2760 kPa. Even under optimum conditions, conversion of methane to a product consisting essentially of hydrogen plus carbon monoxide in the substantial absence of steam and carbon dioxide is not achieved, i.e. the ($H_2 + CO$) selectivity of the system is not very good. At lower temperatures and pressures, particularly when using low concentrations of steam, methane conversion and ($H_2 + CO$) selectivity fall off and the catalyst becomes poisoned by carbon deposition.

SUMMARY OF THE INVENTION

We have discovered that it is possible to effect the catalytic partial oxidation of methane under relatively mild conditions of temperature (650°–900° C.) and pressure (preferably 10–600 kPa i.e. 0.1–6 Atmospheres) to give a product consisting essentially of $H_2 + CO$ (plus $N_2$ if air is used as the oxidant). The molar $H_2:H_2O$ and $CO:CO_2$ ratios in the product gas are both at least 8:1.

This is achieved without the need to use steam; steam inevitably generates $CO_2$ and thus reduces the ($H_2+CO$) selectivity of the system.

This invention results from our discovery of such catalysts.

The invention provides a method of converting a reactant gas mixture comprising methane and oxygen in a molar ratio of at least 1.7:1 into a product gas mixture comprising mainly hydrogen and carbon monoxide and optionally $H_2O$ and $CO_2$ in which the $H_2:H_2O$ ratio is at least 8:1 and the $CO:CO_2$ ratio is at least 8:1, which method comprises bringing the reactant gas mixture at a temperature of about 650° C. to 900° C. into contact with a solid catalyst which is either:

(a) a catalyst of the formula $M_xM'_yO_z$ where:

M is at least one element selected from Mg, B, Al, Ln, Ga, Si, Ti, Zr and Hf,

Ln is at least one member of lanthanum and the lanthanide series of elements,

M' is a d-block transition metal, and each of the ratios $x/z$ and $y/z$ and $(x+y)/z$ is independently from 0.1 to 8; or (b) an oxide of a d-block transition metal; or (c) a d-block transition metal on a refractory support; or (d) a catalyst formed by heating a) or b) under the conditions of the reaction or under non-oxidizing conditions.

Each of the ratios $x/z$ and $y/z$ and $(x+y)/z$ is independently from 0.1 to 8, preferably from 0.2 to 1.0. This definition covers simple metal oxides such as NiO and $RuO_2$;

ternary mixed metal oxides such as $Pr_2Ru_2O_7$; and particles of metals such as Ni, Ru and Pd on solid oxide supports such as $Al_2O_3$, MgO, $SiO_2$ and $Ln_2O_3$.

Alteratively, these metal oxide systems may be catalyst precursors, from which the active catalyst is formed by heating under non-oxidizing conditions. For example, the catalyst precursor may decompose to yield the metal on the oxide support.

All these metal oxide systems may be crystalline, monophasic or polyphasic, they may be amorphous, they may be stoichiometric or non-stoichiometric; they may have defect structures. They may be solid solutions.- The values of x, y and z may be integral or non-integral. In the mixed metal oxides, the ratio of x to y is not critical and may for example be from 0.001 to 1000.

BRIEF DESCRIPTION OF THE DRAWING

FIG. 4a is MgKα XPS of as prepared $Pr_2Ru_2O_7$— low resolution;

FIG. 4b is MgKα XPS of used $Pr_2Ru_2O_7$—low resolution;

FIG. 5 is MgKα XPS of $Pr_2Ru_2O_7$—high resolution—Pr3d, $RuM_{4,5}$, and CKLL peaks.

DESCRIPTION OF PREFERRED EMBODIMENTS

Figure 1:
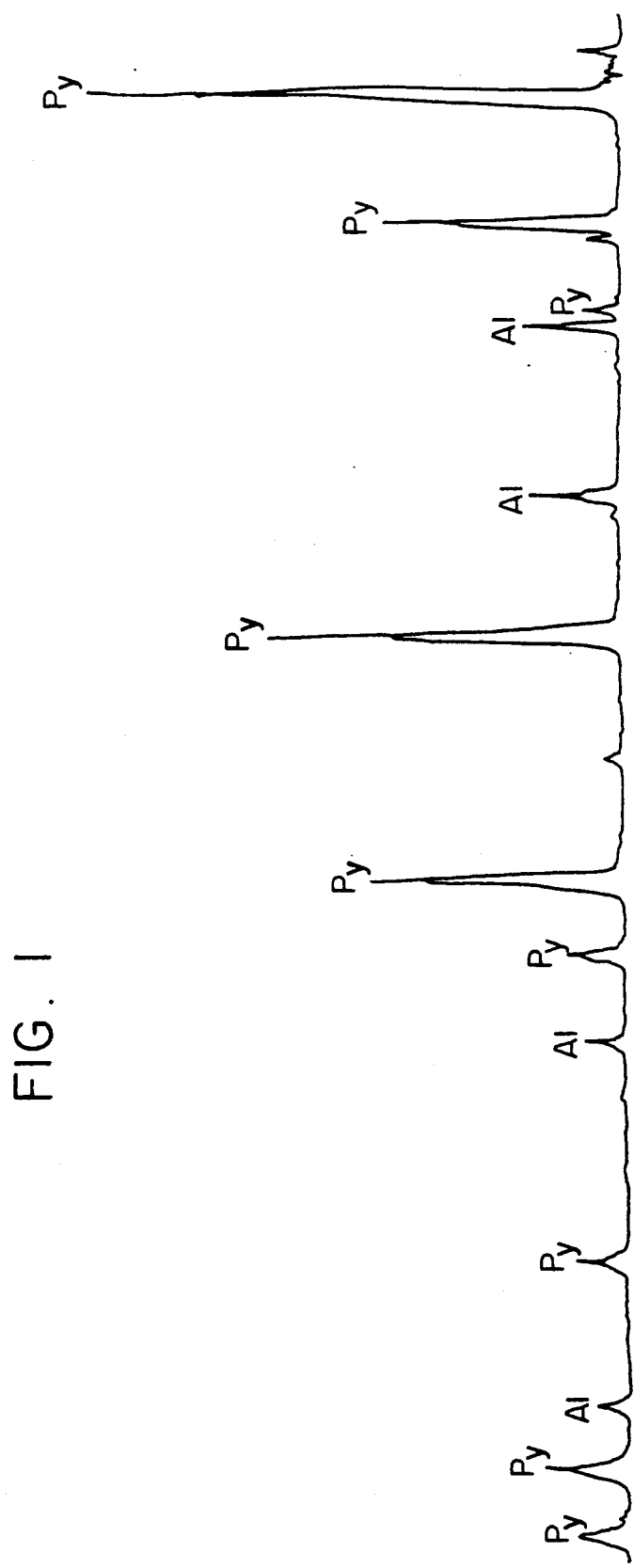
FIG. 1 is an X-ray powder diffraction pattern of $Pr_2Ru_2O_7$ catalyst with excess $RuO_2$.

Some of the mixed metal oxides catalysts are members of a structural class known as pyrochlores (E. F. Bertant, F. Forrat and M. C. Montmory, Compt. Rend. (Paris) 249, 829 (1959)).

d-Block transition metals M' are selected from those having atomic number 21-29, 40-47 and 72-79, the metals scandium, titanium, vanadium, chromium, manganese, iron, cobalt, nickel, copper, zirconium, niobium, molybdenum, technetium, ruthenium, rhodium, palladium, silver, hafnium, tantalum, tungsten, rhenium, osmium, iridium, platinum, and gold. Preferably M' is selected from Fe, Os, Co, Rh, Ir, Pd, Pt and particularly Ni and Ru.

Oxide catalyst precursors may be prepared in a number of ways. Typically for $M_2M'_2O_7$, an intimate mixture of two metal oxides in the required proportions is heated to a temperature and for a time sufficient to form a homogeneous phase. The heating temperature varies, depending on the nature of the metal oxides used; it is generally at least 250° C., and may be as high as 1400° C. It is possible simply to mix two or more preformed metal oxide powders. More sophisticated mixing techniques are well known in the ceramic processing field, and are likely to be effective in reducing the time and/or temperature required to achieve homogeneity.

Alternatively the metal oxides, or precursors thereof such as carbonates or nitrates, or organometallic derivatives or any thermally decomposable salts, can be precipitated onto a refractory solid which may itself be massive or particulate. One metal oxide or precursor may be precipitated onto the other. For example, $Ru_3(CO)_{12}$ or $Ru(\eta\text{-indenyl})_2$ in toluene may be precipitated onto a powdered metal oxide (e.g. $PrO_2$) or onto a high surface area form of metal oxides such as MgO, $Al_2O_3$, $SiO_2$, $ZrO_2$, $TiO_2$, or $HfO_2$. After drying, the coated material is heated, generally in air or oxygen, typically at temperatures up to 450° C., but possibly lower or higher (as described in example 19).

The catalyst may need to be pre-activated by being heated under conditions which are non-oxidizing or perhaps even reducing. For this purpose, it may be sufficient to pass a reactant gas mixture comprising methane and oxygen over the catalyst, provided that the oxygen content is not too high. Alternatively, the catalyst may be heated, prior to use, in an inert gas such as nitrogen or helium, perhaps together with methane or oxygen, or in a reducing gas such as hydrogen or methane. The catalyst may have been formed by heating the mixed metal oxides, not in air or oxygen, but under non-oxidizing or reducing conditions.

In this specification, the usual terms hydrogen, nitrogen and oxygen are used (rather than dihydrogen, dinitrogen and dioxygen) to refer to the dimer molecules generally encountered.

Into contact with this solid catalyst is brought a reactant gas mixture including methane and oxygen. The catalyst performs well in the absence of water, but the presence of traces or small quantities of water vapour in the reactant gases is not deleterious. Alternatively, water may be added in which case the reactions will include those normally associated with steam reforming. If water is present in the reactant gas mixture, it is preferably in a smaller molar proportion than oxygen. Water is preferably not added to the reactant gas mixture. The reactant gas mixture is preferably substantially free of water.

The reaction conditions, in particular temperature, are sufficient to effect conversion into a product gas mixture comprising mainly hydrogen and carbon monoxide. The temperature may be about 650° to 900° C., particularly 700° to 800° C. As shown in examples 2, 6, and 7, the selectivity to products CO and $H_2$ is very dependent on temperature. Furthermore, the selectivity increases as the temperature increases. So that, though in all cases, all (<99.5%) of the oxygen is consumed, the $CO:CO_2$ ratio will increase from ca. 1:20 at 650K (377° C.) to ca. 10:1 at 1050K (777° C.). Similarly the $H_2:H_2O$ ratio will typically increase from ca. 1:4 to ca. 20:1 as the temperature is increased from 650° K. (377° C.) to 1050° K. (777° C.).

Reaction pressure is preferably up to about 5.0 MPa (50 Atm) paticularly about 10 to 600 kPa (0.1 to 6.0 Atm). The selectivity of the reaction decreases with increasing pressure. Flow rates are reported below in the examples in terms of gas hourly space velocity (GHSV).

The condition for the gas mixture at any point in the system must obviously be chosen to be non-explosive at the temperature and pressure conditions desired. As is well known in the field, this may be achieved by introducing oxygen into methane (optionally with an inert carrier such as nitrogen) at a rate comparable to its rate of reaction with the methane so that the proportion of unreacted oxygen never rises to a dangerous value. Alternatively and less preferably, methane may be carefully introduced into oxygen or an oxygen-rich carrier gas, at a rate to prevent a dangerous build-up of methane concentration. With these provisos, the overall molar ratio of methane to oxygen is preferably at least about 1.7, e.g. in the range from 1.7 to 2.3, depending on the pressure. A slight stoichiometric excess of methane (>2:1 $CH_4:O_2$) may improve selectively by depressing formation of carbon dioxide and water; a slight stoichiometric excess of oxygen may improve the overall percentage conversion of methane. The optimum ratio may be a balance between these conflicting requirements.

It may be convenient to use oxygen in the form of air. In that case, it appears that the nitrogen simply acts as a diluent.

It may be noted that ruthenium and nickel catalysts on refractory supports are used commercially for the steam reforming of methane. We presently believe that steam may be formed as a transient intermediate in the partial oxidation of methane according to our method. On this basis, we expect that supported metal catalysts which are effective for steam reforming methane will also be effective for the method of this invention.

In our hands, the catalysts appear to retain their activity for long periods of time. No diminution in catalyst activity has been observed in reactions lasting for thirty hours. However, as indicated by its X-ray diffraction pattern, the catalyst is not the same after use as it was before use. The nature of the change is not precisely known, but is believed to take place by a pre-activation step, which typically occurs during the first thirty minutes of use at temperatures ca. 1050° K. with an appropriate reactant gas mix. For example, XRD, AEM, XPS, and HRTEM spectroscopic studies were made on samples of the catalyst $Pr_2Ru_2O_7$ both before and after use in the catalytic conversion. These data showed that after the catalytic reaction there were small particles of ruthenium metal on the surface of the mixed oxide support. We believe that these metal particles contain on their surface the active catalytic sites. The term catalyst is used herein to describe both the initial material placed in the reactor at the outset, and also the material(s) to which the initial material has been transformed as a consequence of pre-activation or of interaction with the reactant gas mixture.

Using the catalysts herein described, we have been able to achieve at least 90% and up to 98% conversion of methane to a product gas mixture in which the ratio $H_2:H_2O$ was typically greater than 8:1 and often 20:1 or greater; and in which the ratio $CO:CO_2$ was typically at least 8:1.

It is probable that the metal particles contain the active catalytic sites in many of the other catalysts.

Figure 2:
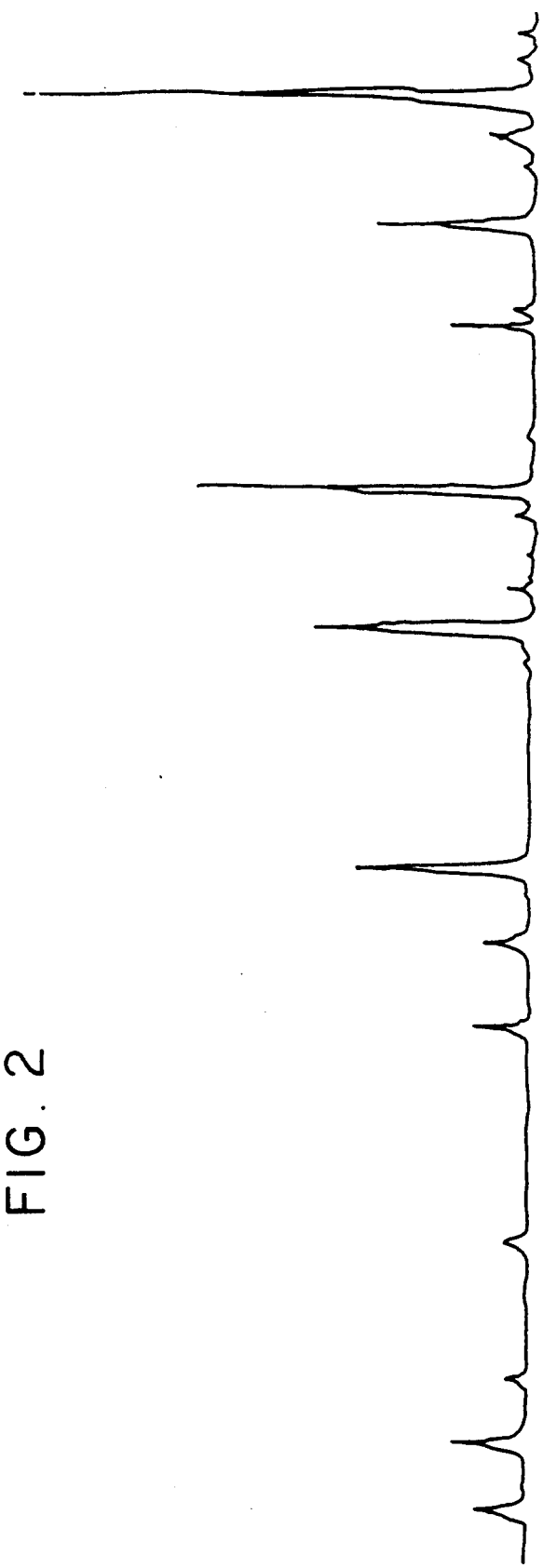
FIG. 2 is an X-ray powder diffraction pattern of $Pr_2Ru_2O_7$ catalyst with excess $PrO_x$.
Figure 3:
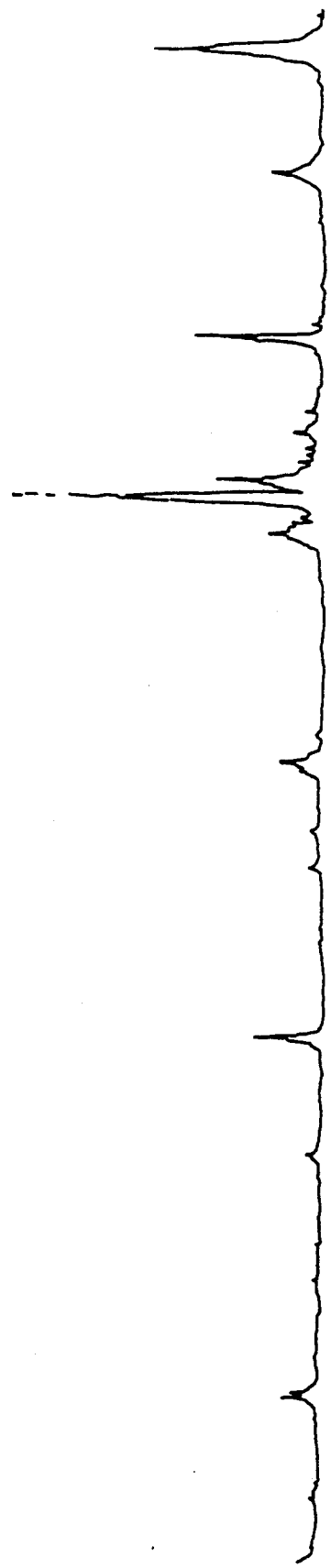
FIG. 3 is an x-ray powder diffraction pattern of $Pr_2Ru_2O_7$ catalyst after 14 hours use.

Reference is directed to the accompanying drawings, in which each of FIGS. 1 to 3 is an X-ray powder diffraction pattern of a catalyst of formula substantially $Pr_2Ru_2O_7$:

FIG. 1 shows the catalyst of example 2 before use, which contains a small stoichiometric excess of $RuO_2$.

FIG. 2 shows the catalyst of example 3 before use, which contains a small excess of $PrO_2$.

Although the X-ray powder diffraction pattern of the "$Pr_2Ru_2O_7$" catalysts of examples 2, 3 and 4 show the presence of only traces of phases other than the cubic phase attributed to the pure "pyrochlore" structure (pure $Pr_2Ru_2O_7$), quantitative measurements by analytical electron microscopy (AEM) show that a range of different oxide phases exist within the furnace product.

FIG. 3 shows the catalyst of example 3 after use for several hours, and, in particular, the formation of ruthenium metal.

Figure 6:
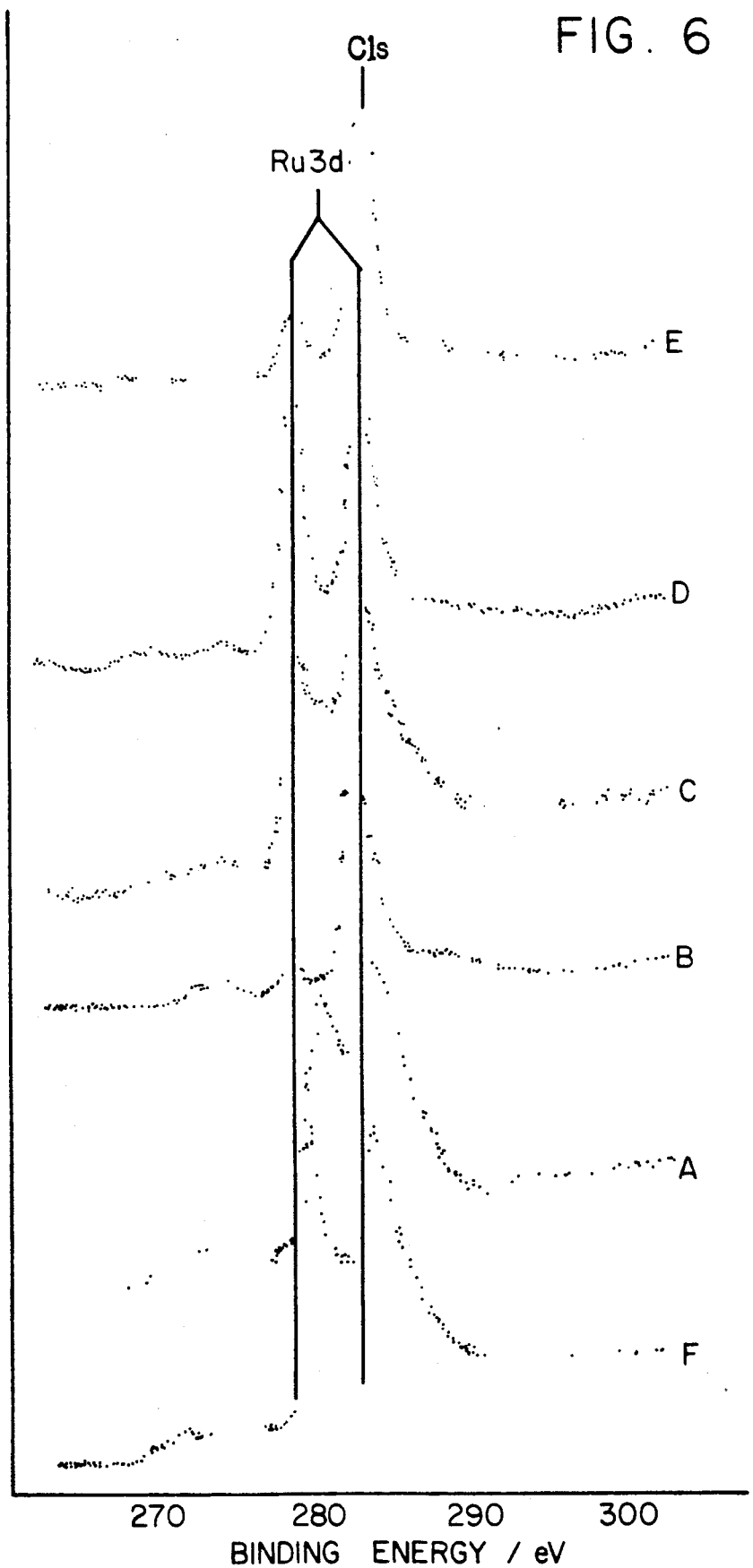
FIG. 6 is MgKα XPS of $Pr_2Ru_2O_7$—high resolution—Ru3d and C1s peaks.

We have carried out an XPS study of the catalyst "$PR_2Ru_2O_7$". The samples investigated were: sample A, "$Pr_2Ru_2O_7$" formed by heating $PrO_x$ and $RuO_2$ at 900° C. for 100 h in air. Sample the material formed by heating the sample from A at 1050K in a flow of $O_2$, $N_2$ and $CH_4$ under the conditions of example 2. Sample C, the material formed by heating sample B in pure $O_2$ (100 mbar) at 900K for 10 minutes. Sample D, the material formed by heating sample C in methane (100 mbar) at 900K for 10 minutes. Sample E, the material formed by heating sample D in methane (100 mbar) at 1100K for 10 minutes. Sample F, pure $RuO_2$ (Aldrich Chemical Co.) as used in the catalyst synthesis. Typical XPS data are shown in FIGS. 4-6 and Tables 17-19.

The examples showed the following properties of the surfaces of the samples A to E.

(i) Over a samplingd epth of about 20 Å the ratio Pr/Ru is approximately the same (i.e. 1.15 ) for all samples, Table 15. The anomalies in B and E arise fromthe extra C 1s peak, only present in these two, which overlaps, and thus artificially increases, the Ru 3d peak. Hopwever, for the samples B, C, and D, which have been reacted, the Pr/Ru ratio over the first 7 Å depth show enrichment of Ru, Table 16.Therefore enrichment of the surface in ruthenium occurs during the initiation of the catalyst.

(ii) The peaks assigned to the Ru in the surface of the catalyst samples which had been reacted with methane are all shifted to lower binding energies than for the sample A, Table 17. This suggests the ruthenium is in a lower oxidation state in the activated catalyst. The Ru 3d peak occurs as a well-resolved doublet which is characteristics for ruthenium metal, as opposed to $RuO_2$. This suggests that ruthenium segregating to the surface during the reaction with methane has been reduced to the metal. The Ru peak of the sample C reacted with oxygen has the appearance analogous to that of $RuO_2$. This surface layer layer can be reduced again to ruthenium metal by heating under methane, sample The samples B and E which have been exposed to temperatures >100K showed substantial surface cdoverage of FIGS. 5, 6. The binding energies for the carbon lie below those carbon bonded to oxygen and above those normally associated with carbide species. but are typical for a thick layer of graphite carbon.

EXAMPLES

All the examples were carried out using 50 mg of solid, powdered catalyst, lightly packed between <20 mg of silica wool (MULTILAB) in a straight silica reaction tube of i.d. ca. 4 mm. The reaction tube (300 mm) was placed in the vertical tube furnace of a LABCON microreactor and connected to a supply of the gas reaction mixture. The reactant gases, methane (supplied by Union Carbide, Gas and Equipment Ltd.), dioxygen (supplied by Air Products) and dinitrogen (supplied by Air Products) were dried over molecular sieves and passed over the catalyst at a rate of 20-50 ml/min (GHSV of $4-7 \times 10^4$ hour $^{-1}$). The temperature of the reaction tube was raised from ambient to the required temperature (typically 1050K, unless oterhwist stated) over a period of 2 hours. The reaction products were monitored using an on-line Hewlett-Packard 5890A gas chromatography apparatus. Separation of all gases was obtained using Helium carrier gas through Porapak Q and 5 Å molecular sieve packed columns, and were detected using a Thermal Conductivity Detector, calibrated on site. In all cases, $O_2$ conversion was >99.5%, and C, H, O, N mass balances were better than 96%.

The specific details are given below.

EXAMPLE 1

(Comparative)

Catalyst: $RuO_2$ (pure, Aldrich Chemical Company Ltd.)

| Initial gas pressures ca.: | $CH_4$ | 217 torr |
|---|---|---|
| | $O_2$ | 108 torr |
| | $N_2$ | 435 torr |

Total 760 torr = 760 mm Hg = 1 atm = 0.1 MPa
GHSV = $7 \times 10^4$ hour $^{-1}$

TABLE 1

| | | Product Partial Pressures/torr | | | |
|---|---|---|---|---|---|
| Temp/K. | $CH_4$ converted | CO | $CO_2$ | $H_2$ | $H_2O$ |
| 1050 | 60% | 88 | 21 | 165 | 52 |
| Duration of reaction 4 h. | | | | | |

In this prior art method, 60% conversion of methane was achieved, with ratios of $CO:CO_2$ and $H_2:H_2O$ below 5:1.

EXAMPLE 2

The effect of variations of temperature on the conversion of methane and selectivity towards CO and $H_2$.

Catalyst $Pr_2Ru_2O_7$ (prepared from an intimate mixture of $Pr_6O_{11}$ (0.290 g) and $+6RuO_2$ (0.223 g) in an open crucible for 100; hours at 900° C.). The X-ray powder diffration pattern, FIG. 1, shows slight excess of $RuO_2$ in the sample

| Reactant gas partial pressures | $N_2$ | 434 mm Hg |
|---|---|---|
| were maintained at ca.: | $CH_4$ | 216 mm Hg |
| | $O_2$ | 108 mm Hg |

GHSV maintained at $7 \times 10^4$ hour $^{-1}$
Runs in chronologicla order.

TABLE 2

| Temp K. | $CH_4$ converted | Product gas partial pressures mm Hg | | | |
|---|---|---|---|---|---|
| | | $H_2$ | CO | $CO_2$ | $H_2O$ |
| 975 | 48% | 138 | 39 | 53 | 46 |
| 1000 | 55% | 166 | 56 | 46 | 38 |
| 1020 | 78% | 245 | 108 | 22 | 15 |
| 1030 | 82% | 258 | 115 | 19 | 11 |
| 1040 | 84% | 263 | 120 | 16 | 10 |
| 1050 | 87% | 272 | 126 | 14 | 7 |

It is apparent from Table 2 that increasing the catalyst temperature increased the conversion of methane and also increased the $CO:CO_2$ and $H_2:H_2O$ ratios in the product gas.

EXAMPLE 3

Catalyst preparation: 0.112 g $RuO_2$ and 0.155 g $PrO_2$ were intimately mixed in an agate mortar with pestle, and the resulting mixture transferred to can open porcelain crucible and heated in a Gallenkamp muffle furnace at 950° C. for 100 hours.

The black solid thus obtained was then put on an Aluminium plate in an X-ray powder diffractometer and its spectrum recorded, FIG. 2.

50 mg of the catalyst was then lightly packed between <20 mg silica wool (Multilab) in a 4 mm i.d. vertical silica tube, held in a steel block heated to 1050K, $CH_4$ and $O_2$ (2:1) passed for 3 hours with poor selectivity and conversion.

Nitrogen was passed over the catalyst for 12 hours at this temperature, after which time the gas mixture was changed to a mixture of $N_2$, $CH_4$ and $O_2$. The products were analyzed after allowing ca. 30 minutes initiation time.

A GHSV of $4 \times 10^4$ hour $^{-1}$ was used throughout these experiments, and the temperature was maintained at 1050K.

The combined partial pressures of the reaction mixture of gases one atmosphere throughout this experiment.

These experimental data given in Table 3 were carried out over a period of 30 hours, during which time no change in catalyst activity or selectivity was observable. An X-ray diffraction pattern of the catalyst after use is shown in FIG. 3. By comparison with FIG. 2, it appears that the catalyst has been significantly modified.

TABLE 3

| Effect of variation of partial pressures of the reactant gases. | | | | | | | | |
|---|---|---|---|---|---|---|---|---|
| Reactant gas partial pressures mm Hg | | | $CH_4$ | $CH_4$ | Product gas partial pressures mm Hg | | | |
| $N_2$ | $CH_4$ | $O_2$ | $O_2$ | converted | $H_2$ | CO | $CO_2$ | $H_2O$ |
| 427 | 227 | 110 | 2.15 | 90% | 297 | 141 | 3 | 2 |
| 394 | 248 | 118 | 2.10 | 91% | 311 | 152 | 5 | 1 |
| 409 | 236 | 115 | 2.06 | 93% | 302 | 149 | 6 | 2 |
| 424 | 225 | 111 | 2.03 | 94% | 300 | 144 | 6 | 2 |
| 433 | 216 | 110 | 1.96 | 95% | 288 | 141 | 6 | 5 |
| 433 | 213 | 114 | 1.86 | 96% | 289 | 137 | 10 | 7 |
| 438 | 204 | 118 | 1.72 | 98% | 306 | 136 | 14 | 14 |
| 0 | 511 | 248 | 2.06 | 88% | 474 | 228 | 15 | 9+ |
| 0 | 536 | 224 | 2.39 | 77% | 452 | 222 | 8 | 11 |

TABLE 3-continued

Effect of variation of partial pressures of the reactant gases.

| Reactant gas partial pressures mm Hg | | | CH$_4$/O$_2$ | CH$_4$ converted | Product gas partial pressures mm Hg | | | |
|---|---|---|---|---|---|---|---|---|
| N$_2$ | CH$_4$ | O$_2$ | | | H$_2$ | CO | CO$_2$ | H$_2$O |
| 0 | 587 | 173 | 3.39 | 56%* | 392 | 200 | 2 | 4 |

*This ran for 14 hours with no change in activity or selectivity.

The data in Table 3 shows that an increase in the proportion of oxygen relative to methane gives a greater overall conversion of methane, up from 88% to 98% or greater. However this is accompanied by a small reduction in selectivity as indicated by the increasing proportions of CO$_2$ and H$_2$O in the products. In this stable, the CO:CO$_2$ ratios range from approximately 10 to 50; and the H$_2$:H$_2$O ratios range from approximately 20 to 150.

EXAMPLE 4

The same "Pr$_2$Ru$_2$O$_7$" catalyst as used in Example 3 was tested at higher pressures.

Experiments at elevated pressures of reactant gases showed conversion and selectivities comparable to those found at 1 atm could be achieved.

TABLE 4

| Total P bar | Initial pressures mm Hg | | | CH$_4$/O$_2$ | CH$_4$ converted | Product partial pressures mm Hg | | | |
|---|---|---|---|---|---|---|---|---|---|
| | N$_2$ | CH$_4$ | O$_2$ | | | H$_2$ | CO | CO$_2$ | H$_2$O |
| 1.0 | 0 | 571 | 189 | 3.02 | 64% | 420 | 211 | 2 | 6 |
| 1.0 | 0 | 587 | 173 | 3.39 | 56% | 392 | 200 | 2 | 4 |
| 20.0 | 3480 | 9650 | 2060 | 4.68 | 28% | 3640 | 1750 | 457 | 610 |
| 20.0 | 1080 | 12110 | 2000 | 6.04 | 23% | 3820 | 1800 | 434 | 482 |
| 20.0 | 0 | 12750 | 2440 | 5.22 | 26% | 4160 | 1940 | 577 | 666 |

Lower CH$_4$ conversion reflects the excess of CH$_4$ over stoichiometry. Selectivities to CO and H$_2$ were slightly lower at 20 atm. A trace of C$_2$ products was observed.

EXAMPLE 5

Catalyst Gd$_2$Ru$_2$O$_7$, prepared by heating Gd$_2$O$_3$+2RuO$_2$ in a sealed evacuated silica tube at 100° C. for 100 hours. The X-ray powder diffraction pattern shows that the sample is solely the pure pyrochlore, Gd$_2$Ru$_2$O$_7$.

TABLE 5

| Reactant gas partial pressures mm Hg | | | CH$_4$/O$_2$ | CH$_4$ converted | Product gas partial pressures mm Hg | | | |
|---|---|---|---|---|---|---|---|---|
| N$_2$ | CH$_4$ | O$_2$ | | | H$_2$ | CO | CO$_2$ | H$_2$O |
| 421 | 229 | 110 | 2.07 | 92% | 304 | 149 | 4 | 3 |
| 422 | 226 | 111 | 2.03 | 93% | 293 | 144 | 6 | 4 |
| 425 | 222 | 113 | 1.97 | 94% | 291 | 143 | 6 | 6 |
| 423 | 222 | 115 | 1.93 | 95% | 292 | 143 | 8 | 6 |
| 0 | 512 | 248 | 2.07 | 83% | 451 | 221 | 18 | 21 |

EXAMPLE 6

The same Gd$_2$Ru$_2$O$_7$ catalyst as used in Example 5 was trested under conditions of variable temperature. The experiments are in chronological order.

| The reactant gas partial pressures were kept constant at: | CH$_4$ | 512 mm Hg |
|---|---|---|
| | O$_2$ | 248 mm Hg |
| | (CH$_4$/O$_2$ = 2.07) | |

TABLE 6

| Temp K. | CH$_4$ converted | Product partial pressures mm Hg | | | |
|---|---|---|---|---|---|
| | | H$_2$ | CO | CO$_2$ | H$_2$O |
| 1050 | 83% | 451 | 221 | 18 | 21 |
| 900 | 57% | 324 | 134 | 74 | 71 |
| 950 | 66% | 376 | 169 | 51 | 50 |
| 1000 | 73% | 412 | 193 | 36 | 36 |

This example shows how selectivity decreases as the temperature is lowered from 1050 K.

EXAMPLE 7

Catalyst Eu$_2$Ru$_2$O$_7$, prepared by heating Eu$_2$O$_3$+2RuO$_2$ in a sealed evacuated silica tube at 1000° C. for 100 hours. The X-ray powder diffraction pattern shows that the sample is mostly the pure pyrochlore, Eu$_2$Ru$_2$O$_7$, but there are traces of other phases present.

The catalyst was tested under conditions of variable temperature. The runs are in chronological order.

| The reactant gas partial pressures were kept constant at: | CH$_4$ | 512 mm Hg |
|---|---|---|
| | O$_2$ | 248 mm Hg |
| | (CH$_4$/O$_2$ = 2.07) | |

TABLE 7

| Temp K. | CH$_4$ converted | Product partial pressures mm Hg | | | |
|---|---|---|---|---|---|
| | | H$_2$ | CO | CO$_2$ | H$_2$O |
| 1050 | 87% | 466 | 229 | 12 | 14 |
| 1000 | 80% | 434 | 214 | 25 | 26 |
| 1020 | 83% | 449 | 222 | 20 | 21 |
| 1040 | 86% | 463 | 227 | 15 | 15 |
| 1050 | 87% | 467 | 230 | 13 | 13 |

EXAMPLE 8

A dispersion of Ruthenium on Alumina was prepared by supporting Ru($\eta^5$-C$_9$H$_7$)$_2$ on predried Al$_2$O$_3$, using an incipient wetness technique with CH$_2$Cl$_2$ solvent. The uniformly yellow solid was thenr educed under a stream of H$_2$ at 200° C. for 1 hour and at 800° C. for 4 hours.

TABLE 8

| Reactant gas partial pressures mm Hg | | | CH$_4$/O$_2$ | CH$_4$ converted | Product gas partial pressures mm Hg | | | |
|---|---|---|---|---|---|---|---|---|
| N$_2$ | CH$_4$ | O$_2$ | | | H$_2$ | CO | CO$_2$ | H$_2$O |
| 389 | 254 | 117 | 2.17 | 89% | 311 | 155 | 3 | 2 |
| 391 | 247 | 122 | 2.02 | 93% | 312 | 154 | 6 | 4 |
| 0 | 512 | 248 | 2.06 | 87% | 467 | 229 | 12 | 16 |

EXAMPLE 9

Englehard E catalyst (4871), was tested as received from Englehard. The catalyst is 0.5% Ruthenium on Alumina pellets. The pellets are cylindrical, ca. 3.5 mm high and ca. 3.5 mm diameter. 20 such pellets were loaded into a silica tube of ca. 8 mm i.d. (packed at either end with silica wool), which was then heated to ca. 1050K (±15K), and connected to a gas stream of the appropriate reactant gases. The GHSV was maintained at ca. 10$^4$ hour$^{-1}$ (±20%).

TABLE 9

| Reactant gas partial pressures mm Hg | | | $CH_4$ | $CH_4$ | Product gas partial pressures mm Hg | | | |
|---|---|---|---|---|---|---|---|---|
| $N_2$ | $CH_4$ | $O_2$ | $O_2$ | converted | $H_2$ | CO | $CO_2$ | $H_2O$ |
| 418 | 240 | 101 | 2.37 | 78% | 271 | 133 | 4 | 7 |
| 424 | 234 | 102 | 2.29 | 79% | 266 | 130 | 6 | 9 |
| 426 | 226 | 108 | 2.09 | 86% | 274 | 134 | 9 | 9 |
| 287 | 321 | 152 | 2.11 | 86% | 348 | 172 | 10 | 9 |
| 0 | 634 | 126 | 5.02 | 37% | 314 | 162 | 3 | 7 |
| 0 | 508 | 252 | 2.01 | 83% | 448 | 197 | 23 | 27 |

EXAMPLE 10

A 1% by weight loading of Ruthenium on Alumina was prepared 0.500 g F20 Alumina (Phase Sep), 80-100 mesh, was predried in a muffle furnace at 200° C. for 12 hours and 800° C. for 24 hours. 0.010 g anhydrous Ruthenium trichloride was dissolved in the minimum amount of methanol, prepdried over magnesium turnings. Aliquots of the solution were added to the alumina under a dry nitrogen atmosphere, each time until the alumina was just "wet", then the solvent was removed under reduced pressure at room temperature. In this way, a completely uniform dispersion of $RuCl_3$ on $Al_2O_3$ was obtained. The solid was then transferred under dry nitrogen into a silica tube, which was then attached to a hydrogen supply, and the solid treated under a hydrogen stream at 400° C. for 14 hours, and at 800° C. for 4 hours. The chlorine content of the catalyst was tested by microanalysis, and it was found that the Ruthenium was only partly reduced, since there is some 0.5% residual chlorine.

TABLE 10

| Reactant gas partial pressures mm Hg | | | $CH_4$ | $CH_4$ | Product gas partial pressures mm Hg | | | |
|---|---|---|---|---|---|---|---|---|
| $N_2$ | $CH_4$ | $O_2$ | $O_2$ | converted | $H_2$ | CO | $CO_2$ | $H_2O$ |
| 433 | 222 | 104 | 2.13 | 91% | 286 | 142 | 3 | 2 |
| 421 | 229 | 110 | 2.09 | 92% | 295 | 146 | 3 | 3 |
| 428 | 223 | 109 | 2.04 | 94% | 294 | 145 | 4 | 3 |
| 432 | 217 | 110 | 1.97 | 95% | 290 | 143 | 6 | 4 |
| 0 | 512 | 248 | 2.07 | 88% | 473 | 233 | 11 | 12 |
| 0 | 514 | 250 | 2.04 | 89% | 474 | 232 | 12 | 12† |

† This runs for 24 hours, with no noticeable change in methane conversion or product selectivity.

EXAMPLE 11

A 0.1% by weight loading of Ruthenium on Alumina was prepared:

1.50 g F20 Alumina (Phase Sep)80-100 mesh was dried in a muffle furnace for 12 hours at 200° C. and for 24 hours at 800° C. 0.003 g anhydrous $RuCl_3$ was added to the alumina under dry nitrogen, dissolved in the minimum volume of dry methanol to just "wet" the alumina completely. The methanol was then removed under reduced pressure at room temperature. The uniform dispersion thus produced was then reduced under a steady hydrogen stream for 14 hours at 400° C. and for 10 hours at 800° C. The chlorine content of the catalyst was tested by microanlysis and it was found that almost all of the chlorine still remains in the catalyst. This is reflected in the results of passing the $N_2CH_4O_2$ gas mixture over the catalyst, as the results are far from steady state.

A gas mixture containing 391 torr $N_2$, 251 torr $CH_4$ and 118 torr $O_2$ ($CH_4/O_2 = 2.12$) was passed over the catalyst at 1050K, and 20 ml/min (GHSV=ca. $2 \times 10^4$ hour$^{-1}$).

TABLE 11

| Time hour | % $CH_4$ converted | Product partial pressures mm Hg | | | |
|---|---|---|---|---|---|
| | | $H_2$ | CO | $CO_2$ | $H_2O$ |
| 1 | 34 | 55 | 28 | 52 | 95 |
| 4 | 42 | 110 | 53 | 43 | 72 |
| 11 | 52 | 162 | 79 | 34 | 55 |
| 15 | 59 | 190 | 94 | 29 | 42 |
| 19 | 64 | 214 | 105 | 24 | 35 |
| 24 | 67 | 227 | 110 | 22 | 31 |
| 26 | 69 | 232 | 115 | 19 | 30 |

The catalyst improves over the first 26 hours on stream. In general, this is clearly a much less efficient catalyst than any previously tested. This suggests that there may be an insufficient amount of Ruthenium for formation of an active and selective catalyst.

EXAMPLE 12

A 1% by weight loading Rhodium on Alumina was prepared, as in experiment 10, except with $RhCl_3$ instead of $RuCl_3$. Microanalysis showed that there was some 0.8% residual chlorine.

TABLE 12

| Reactant gas partial pressures mm Hg | | | $CH_4$ | $CH_4$ | Product gas partial pressures mm Hg | | | |
|---|---|---|---|---|---|---|---|---|
| $N_2$ | $CH_4$ | $O_2$ | $O_2$ | converted | $H_2$ | CO | $CO_2$ | $H_2O$ |
| 450 | 210 | 100 | 2.09 | 92% | 273 | 139 | 4 | 4 |
| 428 | 223 | 109 | 2.04 | 94% | 287 | 140 | 5 | 5 |

EXAMPLE 13

A 1% by weight loading of Palladium on Alumina was prepared, as in experiment 10, with a few differences. The $PdCl_2$ used was obtained from Johnson Matthey Plc, and was not pure, but was supplied with an accurate metal assay of 59.87% Pd. 0.017 g of this was dissolved in the minimum volume of concentrated HCl, and added, via an incipient wetness technique, to 1.00 g of predried alumina. This was then treated under flowing hydrogen as before.

TABLE 13

| Reactant gas partial pressures mm Hg | | | $CH_4$ | $CH_4$ | Product gas partial pressures mm Hg | | | |
|---|---|---|---|---|---|---|---|---|
| $N_2$ | $CH_4$ | $O_2$ | $O_2$ | converted | $H_2$ | CO | $CO_2$ | $H_2O$ |
| 435 | 221 | 104 | 2.13 | 90% | 274 | 143 | 4 | 2 |
| 442 | 213 | 105 | 2.03 | 92% | 269 | 140 | 6 | 4 |
| 432 | 219 | 109 | 2.01 | 93% | 277 | 144 | 6 | 5 |

EXAMPLE 14

A commercial Nickel-based steam reforming catalyst (CRG'F', approximate elemental composition $Ni_6Al_2O_9$) was obtained from the London Research Station, British Gas Plc. The pellets were crushed to a powder in an agate mortar with pestle, in air.

TABLE 14

| Reactant gas partial pressures mm Hg | | | $CH_4$ | $CH_4$ | Product gas partial pressures mm Hg | | | |
|---|---|---|---|---|---|---|---|---|
| $N_2$ | $CH_4$ | $O_2$ | $O_2$ | converted | $H_2$ | CO | $CO_2$ | $H_2O$ |
| 420 | 229 | 111 | 2.07 | 93% | 290 | 149 | 5 | 4 |
| 437 | 213 | 110 | 1.93 | 96% | 277 | 143 | 8 | 6 |
| 0 | 516 | 244 | 2.11 | 88% | 475 | 234 | 9 | 9† |

† This was run for 16 hours with no detectable loss of activity or selectivity.

EXAMPLE 15

Catalyst $La_2MgPtO_6$, prepared by heating $La_2O_3$, MgO and $PtO_2$ in air at 1473K for 200 hours. The catalyst has a perovskite structure as checked by powder X-ray diffraction. The catalyst performance gradually improved up to 20 hours under the flowing reqctant gas mixture, when the following data was taken.

TABLE 15

| Reactant gas partial pressures mm Hg | | | | $CH_4$ | $CH_4$ converted | Product gas partial pressures mm Hg | | | |
|---|---|---|---|---|---|---|---|---|---|
| $N_2$ | $CH_4$ | $O_2$ | $O_2$ | | | $H_2$ | CO | $CO_2$ | $H_2O$ |
| 423 | 225 | 112 | 2.02 | | 80% | 241 | 125 | 15 | 18 |

EXAMPLE 16

Catalyst NiO (BDH Chemicals Ltd.), calcined in air at 1150K for 50 hours.

TABLE 16

| Reactant gas partial pressures mm Hg | | | | $CH_4$ | $CH_4$ converted | Product gas partial pressures mm Hg | | | |
|---|---|---|---|---|---|---|---|---|---|
| $N_2$ | $CH_4$ | $O_2$ | $O_2$ | | | $H_2$ | CO | $CO_2$ | $H_2O$ |
| 442 | 218 | 100 | 2.18 | | 72% | 212 | 110 | 16 | 18 |

TABLE 17

| XPS Pr 4d/Ru 3d peak height ratios. see FIG. 4 | | |
|---|---|---|
| | Sample | Pr/Ru |
| A | as prepared | 1.16 |
| B | catalytic | 3.83 |
| C | $O_2$/900 K. | 1.14 |
| D | $CH_4$/900 K. | 1.15 |
| E | $CH_4$/1100 K. | 1.36 |

TABLE 18

| XPS Ru $M_{4,5}$VV/Pr 3d 5/2 peak height ratios. see FIG. 5 | | |
|---|---|---|
| | Sample | Height (Ru $M_{4,5}$VV)/ height (Pr 3d 5/2) |
| A | As prepared | 0.12 |
| C | $O_2$/900 K. | 0.22 |
| D | $CH_4$/900 K. | 0.24 |

TABLE 19

| XPS Peak energy shifts (eV), see FIGS. 5, 6 | | | | | |
|---|---|---|---|---|---|
| | Sample | Ru 3d | Ru 3p | Pr 4d | O 1s |
| F | $RuO_2$ | 280.8 | 462.8 | — | 529.7 |
| A | As prepared | +0.9 | +0.8 | 116 | −0.5/+1.1 |
| B | catalytic | −0.9 | −1.2 | 0 | +1.7 |
| C | $O_2$/900 K. | −0.5 | 0 | 0 | −0.1/+1.5 |
| D | $CH_4$/900 K. | −0.9 | −1.3 | +0.1 | −0.6/+2.0 |
| E | $CH_4$/1100 K. | −0.9 | −1.5 | +0.3 | +0.1 |

EXAMPLE 17

Table 20 showing that a number of different supported metals and mixed metal oxides are efficient catalysts for the partial oxidation reaction. Gas feed, $CH_4:O_2:N_2=2:1:4$. GHSV$=4\times10^4$ hour$^{-1}$. Temp=1050K.

| Catalyst | % Methane converted | % $CH_4$ converted to | |
|---|---|---|---|
| | | CO | $H_2$ |
| 1% Ru/$Al_2O_3$ | 94 | 97 | 99 |
| 1% Rh/$Al_2O_3$ | 94 | 97 | 99 |
| 1% Pd/$Al_2O_3$ | 93 | 96 | 98 |
| 1% Pt/$Al_2O_3$ | 95 | 96 | 99 |
| Ni/$Al_2O_3$* | 94 | 97 | 99 |
| $Pr_2Ru_2O_7$ | 94 | 97 | 99 |
| $Eu_2Ir_2O_7$ | 94 | 96 | 98 |
| $La_2MgPtO_6$ | 80 | 89 | 93 |

*CRG 'F' steam reforming catalyst, ex. British Gas

EXAMPLE 18

Table 21, showing how the methane conversion and selectivity to partial oxidation products vary with methane:oxygen ratio.

Gas feed contains approx. 57% $N_2$ diluent. GHSV$=4\times10^4$ hour$^{-1}$. Temp=1050K. Catalyst=$Pr_2Ru_2O_7$.

| $CH_4/O_2$ ratio | % Methane converted | % $CH_4$ converted to | |
|---|---|---|---|
| | | CO | $H_2$ |
| 1.72 | 98 | 91 | 96 |
| 1.86 | 96 | 93 | 98 |
| 1.96 | 95 | 96 | 98 |
| 2.00 | 94 | 97 | 99 |
| 2.06 | 93 | 97 | 99 |
| 2.10 | 91 | 97 | 100 |
| 2.15 | 90 | 98 | 100 |

EXAMPLE 19

Table 22, showing how the methane conversion and selectivity to partial oxidation products vary with reaction pressure.

No $N_2$ diluent. GHSV$=4\times10^4$ hour$^{-1}$. Temp=1050K. Catalyst=$Dy_2Ru_2O_7$

| Pressure atm. | $CH_4/O_2$ ratio | % Methane converted | % $CH_4$ converted to | |
|---|---|---|---|---|
| | | | CO | $H_2$ |
| 1 | 3.4 | 56 | 99 | 100 |
| 5 | 3.8 | 39 | 91 | 91 |
| 10 | 4.1 | 38 | 90 | 90 |
| 15 | 4.5 | 33 | 86 | 88 |
| 20 | 4.5 | 30 | 85 | 88 |

EXAMPLE 20

Table 23, showing how the methane conversion and selectivity to partial oxidation products vary with reaction temperature.

Gas feed, $CH_4:O_2:N_2=2:1:0$. GHSV$=4\times10^4$ hour$^{-1}$. Catalyst=$Yb_2Ru_2O_7$

| Temperature K. | % Methane converted | % $CH_4$ converted to | |
|---|---|---|---|
| | | CO | $H_2$ |
| 1050 | 83 | 91 | 95 |
| 900 | 53 | 59 | 79 |
| 800 | 39 | 28 | 59 |
| 700 | 31 | 8 | 33 |
| 650 | 29 | 5 | 25 |

EXAMPLE 21

Table 24, showing how the methane conversion and selectivity to partial oxidation products vary with reaction gas space velocity.

Gas feed, $CH_4:O_2:N_2 = 2:1:0$. Temp = 1050K. Catalyst = $Pr_2Ru_2O_7$

| GHSY hour | % Methane converted | % $CH_4$ converted to | |
|---|---|---|---|
| | | CO | $H_2$ |
| $6 \times 10^3$ | 90 | 95 | 98 |
| $4 \times 10^4$ | 88 | 93 | 97 |
| $6 \times 10^4$ | 81 | 89 | 94 |
| $8 \times 10^4$ | 73 | 82 | 90 |
| $2 \times 10^5$ | 68 | 76 | 87 |

We claim:

1. A hydrogen and carbon monoxide selective single step method of converting methane and oxygen in a molar ratio of about 1.7 to 2.3 into a product gas comprsiing mainly hydrogen and carbon monoxide and lesser amounts of water and carbon dioxide in which the $H_2:H_2O$ ratio is at least about 8 and the $CO:CO_2$ ratio is at least about 8, said method comprises contacting said methane and oxygen without the addition of $H_2O$ at a temperature of about 650° to 900° C. and pressure of about 10 to about 600 kPa and a solid catalyst of the formula $M_xM'_yO_z$ where M is selected from the group consisting of Mg, B, Al, Ga, Si, Ti, Zr, Hf and Ln wherein Ln is a member of the lanthanum and lanthanide series of elements; M' is a d-block transiton metal selected from the group consisting of Fe, Os, Co, Rh, Ir, Pd, PT, Ni and Ru; and each of the ratios x/z, y/z and (x+y)/z is about 0.1 to 8; and a catalyst formed by heating said $M_xM'_yO_z$ under non-oxidizing conditions.

2. A method as claimed in claim 1 wherein M is Ln.

3. A method as claimed in claim 1 wherein M' is selected from the group consisting of Ru, Os, Co, Rh, Ir, Pd and Pt.

4. A method as claimed in claim 2 wherein M' is Ru.

5. A method as claimed in claim 1 wherein said catalyst is selected from the group consisting of $Sm_2Ru_2O_7$ and $Pr_2Ru_2O_7$.

6. A method as claimed in claim 1 wherein said temperature about 700° to 800° C.

7. A method as claimed in claim 1 wherein each of said ratios x/z and y/z and (x+y)/z is independently about 0.2 to 1.00.

8. A method as claimed in claim 1 wherein said oxygen is supplied by air.

* * * * *